(12) United States Patent
De Silva et al.

(10) Patent No.: US 11,806,837 B2
(45) Date of Patent: Nov. 7, 2023

(54) DEVICE FOR PRODUCING CO2 PELLETS FROM CO2 SNOW AND CLEANING DEVICE

(71) Applicant: Alfred Kärcher SE & Co. KG, Winnenden (DE)

(72) Inventors: Ruwantha De Silva, Schwieberdingen (DE); Juergen Gassmann, Winnenden (DE); Henning Hayn, Stuttgart (DE); Dieter Plachke, Winnenden (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 1395 days.

(21) Appl. No.: 16/188,955

(22) Filed: Nov. 13, 2018

(65) Prior Publication Data

US 2019/0076989 A1 Mar. 14, 2019

Related U.S. Application Data

(63) Continuation of application No. PCT/EP2016/060913, filed on May 13, 2016.

(51) Int. Cl.
*B24C 11/00* (2006.01)
*B24C 1/00* (2006.01)
(Continued)

(52) U.S. Cl.
CPC .............. *B24C 11/00* (2013.01); *B24C 1/003* (2013.01); *C01B 32/55* (2017.08); *F25C 1/04* (2013.01)

(58) Field of Classification Search
CPC ....... B24C 1/003; B24C 11/00; B24C 7/0046; B24C 7/0069; F25C 1/04
See application file for complete search history.

(56) References Cited

U.S. PATENT DOCUMENTS

| 1,795,772 A | 3/1931 | Goosmann |
| 3,492,197 A | 1/1970 | Olstowski et al. |

(Continued)

FOREIGN PATENT DOCUMENTS

| CN | 2443949 | 8/2001 |
| CN | 2813125 | 9/2006 |

(Continued)

*Primary Examiner* — Filip Zec
(74) *Attorney, Agent, or Firm* — Womble Bond Dickinson (US) LLP

(57) ABSTRACT

The present invention relates to a device for producing high-strength $CO_2$ pellets from $CO_2$ snow, in particular, for a cleaning device for blasting surfaces to be treated with a mixed-flow consisting of a compressed gas and $CO_2$ pellets, including a main compressing device for compressing $CO_2$ snow for forming $CO_2$ pellets, further including a pre-compressing device for pre-compressing $CO_2$ snow produced by expanding liquid $CO_2$, wherein the pre-compressing device is in the form of a fluid-mechanical pre-compressing device, wherein the pre-compressing device includes an expansion device for producing $CO_2$ snow from liquid or gaseous $CO_2$ and a pre-compression chamber for receiving and pre-compressing the produced $CO_2$ snow and wherein the expansion device and the pre-compression chamber are connected to one another in fluidic manner.

34 Claims, 8 Drawing Sheets

Figure 1:
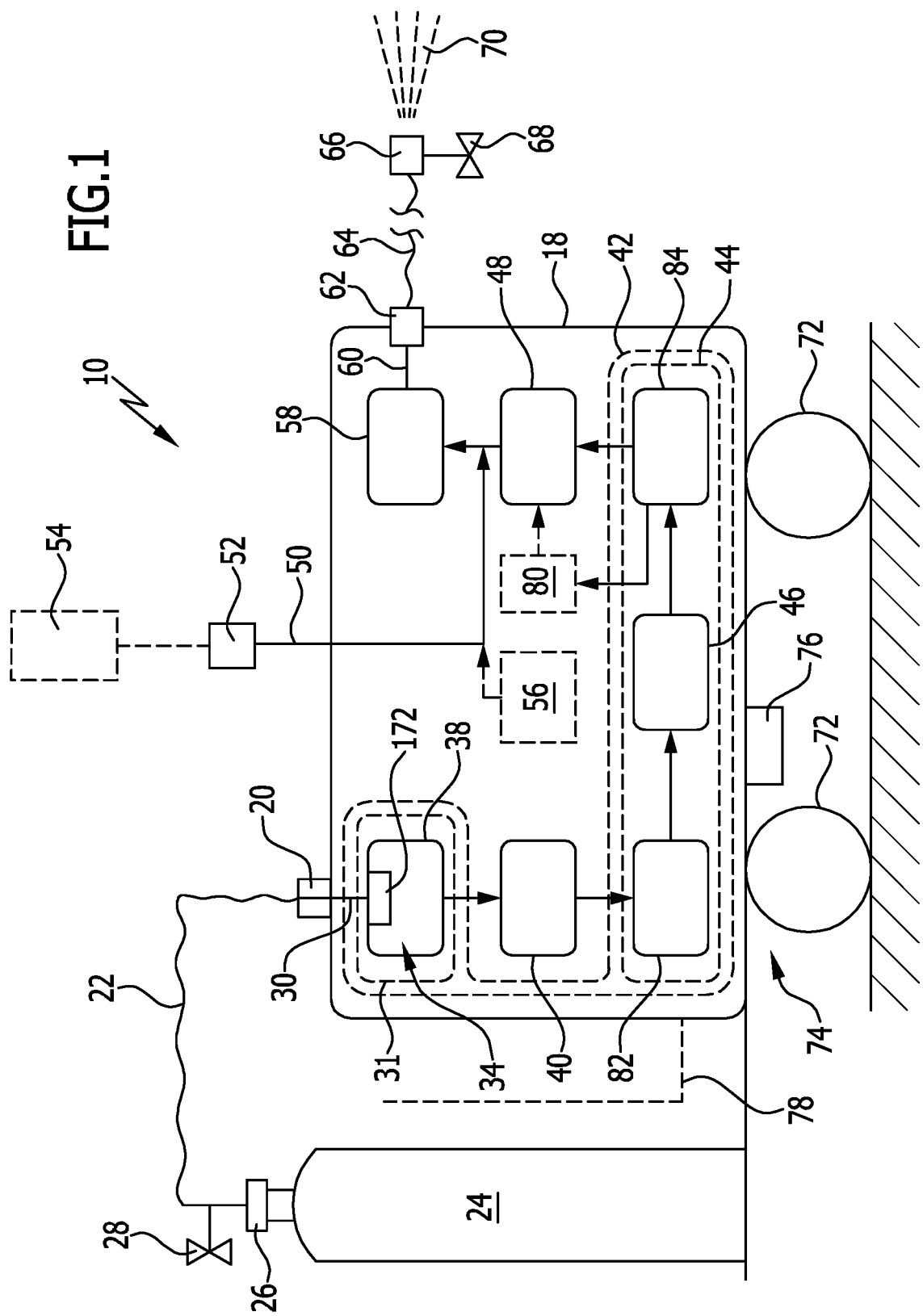

(51) Int. Cl.
    *C01B 32/55*    (2017.01)
    *F25C 1/04*    (2018.01)

(56)      References Cited

U.S. PATENT DOCUMENTS

| | | |
|---|---|---|
| 5,249,426 A | 10/1993 | Spivak et al. |
| 5,419,138 A | 5/1995 | Anderson et al. |
| 5,845,516 A | 12/1998 | Allen, Jr. |
| 6,695,686 B1 | 2/2004 | Frohlich et al. |
| 6,986,265 B2 | 1/2006 | Johansen |
| 9,759,470 B2 * | 9/2017 | Zisholtz .................. F25C 1/04 |
| 2006/0011734 A1 | 1/2006 | Kipp |
| 2015/0175428 A1 | 6/2015 | Heninger |
| 2016/0271755 A1 * | 9/2016 | Demirtas ................ C01B 32/55 |

FOREIGN PATENT DOCUMENTS

| | | | |
|---|---|---|---|
| CN | 2820830 | 9/2006 | |
| CN | 102527660 | 7/2012 | |
| DE | 199 20 296 | 11/2000 | |
| DE | 10 2008 036 331 | 11/2009 | |
| DE | 10 2011 104 284 | 12/2012 | |
| EP | 0 429 698 | 6/1991 | |
| EP | 1 328 765 | 7/2003 | |
| FR | 831 571 | 9/1938 | |
| JP | H10 138141 | 5/1998 | |
| JP | 2006-199539 | 8/2006 | |
| KR | 2015-0117368 | 10/2015 | |
| KR | 2015117368 A * | 10/2015 | ............... F25C 1/00 |
| SU | 1620516 | 1/1991 | |
| WO | WO 95/27591 | 10/1995 | |
| WO | WO 2014/131771 | 9/2014 | |
| WO | WO-2017194175 A1 * | 11/2017 | ............... B24C 1/00 |

* cited by examiner

US 11,806,837 B2

DEVICE FOR PRODUCING CO2 PELLETS FROM CO2 SNOW AND CLEANING DEVICE

CROSS-REFERENCE TO RELATED APPLICATIONS

This application is a continuation of international application number PCT/EP2016/060913 filed on May 13, 2016, which is incorporated herein by reference in its entirety and for all purposes.

FIELD OF THE INVENTION

The present invention relates to a devices for producing high-strength $CO_2$ pellets from $CO_2$ snow generally, and more specifically to a device for producing high-strength $CO_2$ pellets from $CO_2$ snow, in particular for a cleaning device for blasting surfaces to be treated with a mixed-flow consisting of a compressed gas and $CO_2$ pellets, comprising a main compressing device for compressing $CO_2$ snow in order to form $CO_2$ pellets.

Furthermore, the present invention relates to cleaning devices generally, and more specifically to a cleaning device for blasting surfaces to be treated with a mixed-flow consisting of a compressed gas and $CO_2$ pellets.

BACKGROUND OF THE INVENTION

A blasting device for blasting surfaces to be treated with a mixed-flow consisting of a compressed gas and dry ice pellets is known from DE 10 2008 036 331 B3. This device comprises a conveyer screw which presses $CO_2$ snow through a matrix in order to manufacture $CO_2$ pellets.

A disadvantage of the known blasting devices in particular is that, with the compressing device in current use, only $CO_2$ pellets can be manufactured wherein the density-distribution in the density of the resultant $CO_2$ pellets is very inhomogeneous and hence the quality thereof is very variable. In particular, the density of the $CO_2$ pellets produced is not always sufficient for efficient cleaning of surfaces by a blasting process.

SUMMARY OF THE INVENTION

In a first aspect of the invention, a device for producing high-strength $CO_2$ pellets from $CO_2$ snow, in particular, for a cleaning device for blasting surfaces to be treated with a mixed-flow consisting of a compressed gas and $CO_2$ pellets is provided. The device comprises a main compressing device for compressing $CO_2$ snow for forming $CO_2$ pellets. It further comprises a pre-compressing device for pre-compressing $CO_2$ snow produced by expanding liquid $CO_2$. The pre-compressing device is in the form of a fluid-mechanical pre-compressing device. The pre-compressing device comprises an expansion device for producing $CO_2$ snow from liquid or gaseous $CO_2$ and a pre-compression chamber for receiving and pre-compressing the produced $CO_2$ snow. The expansion device and the pre-compression chamber are connected to one another in fluidic manner.

In a second aspect of the invention, a cleaning device for blasting surfaces to be treated with a mixed-flow consisting of a compressed gas and $CO_2$ pellets is provided. The cleaning device further comprises a device for producing high-strength $CO_2$ pellets from $CO_2$ snow. The device for producing high-strength $CO_2$ pellets comprises a main compressing device for compressing $CO_2$ snow for forming $CO_2$ pellets. It further comprises a pre-compressing device for pre-compressing $CO_2$ snow produced by expanding liquid $CO_2$. The pre-compressing device is in the form of a fluid-mechanical pre-compressing device. The pre-compressing device comprises an expansion device for producing $CO_2$ snow from liquid or gaseous $CO_2$ and a pre-compression chamber for receiving and pre-compressing the produced $CO_2$ snow. The expansion device and the pre-compression chamber are connected to one another in fluidic manner.

BRIEF DESCRIPTION OF THE DRAWING FIGURES

Figure 2:
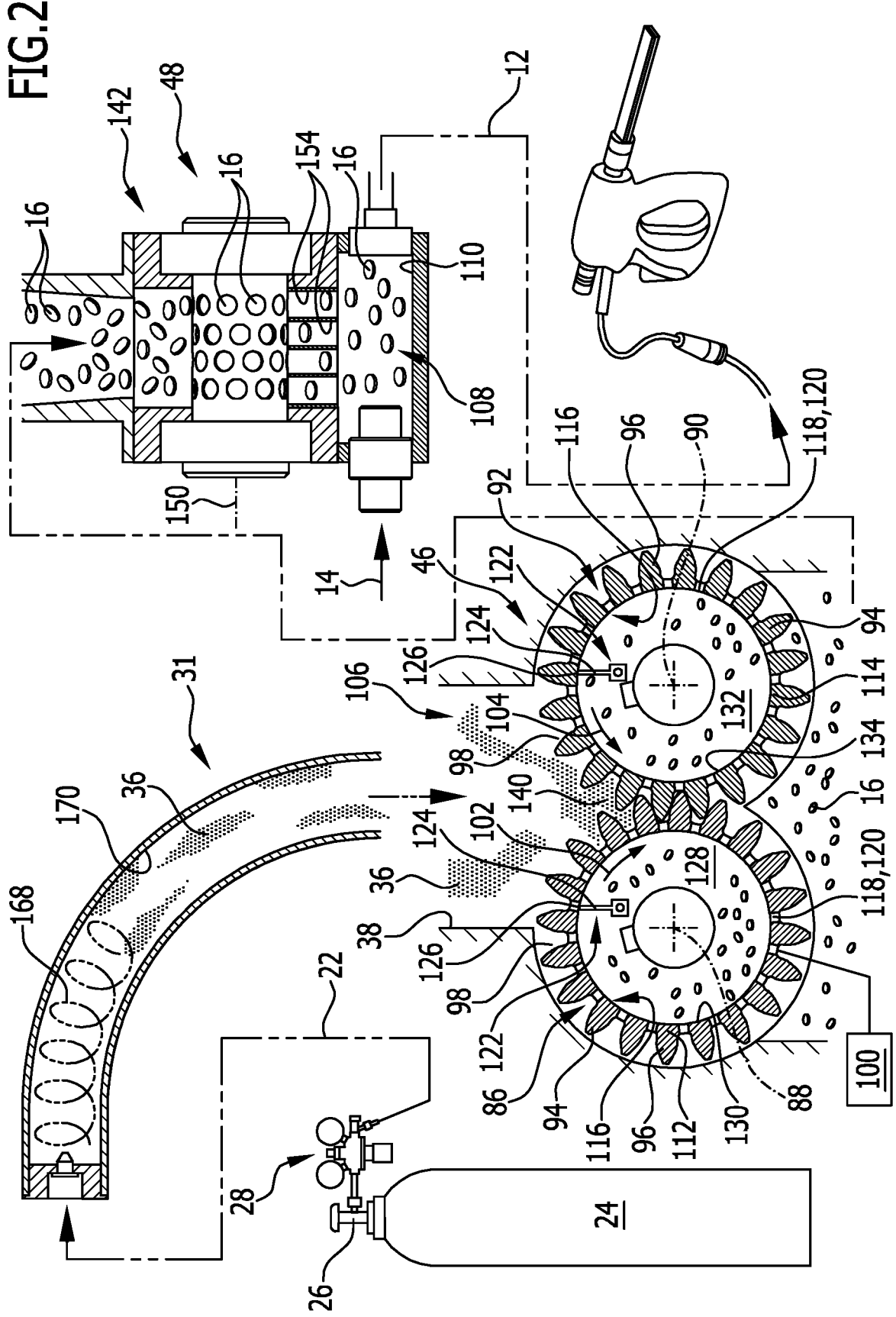
Figure 3:
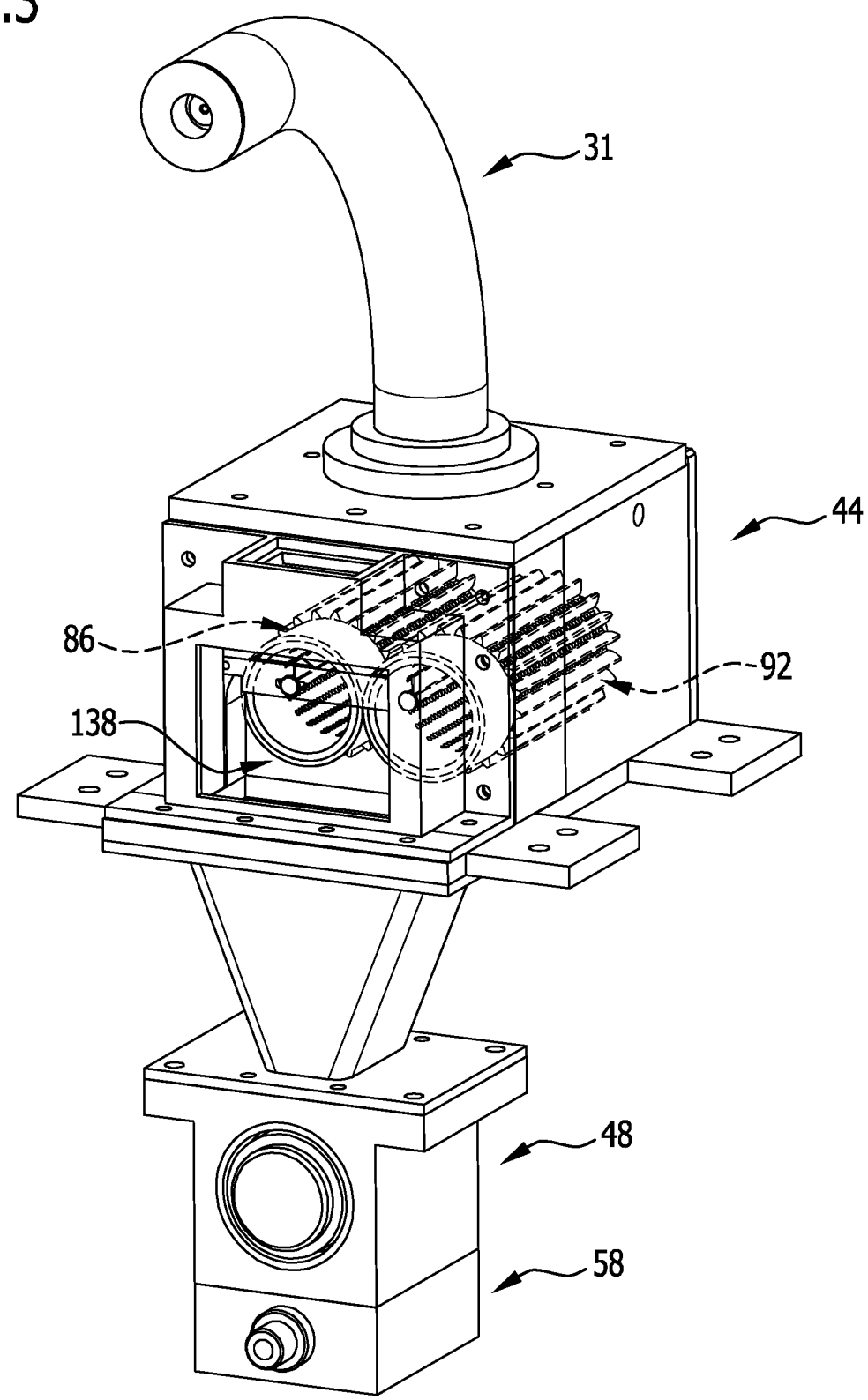
Figure 4:
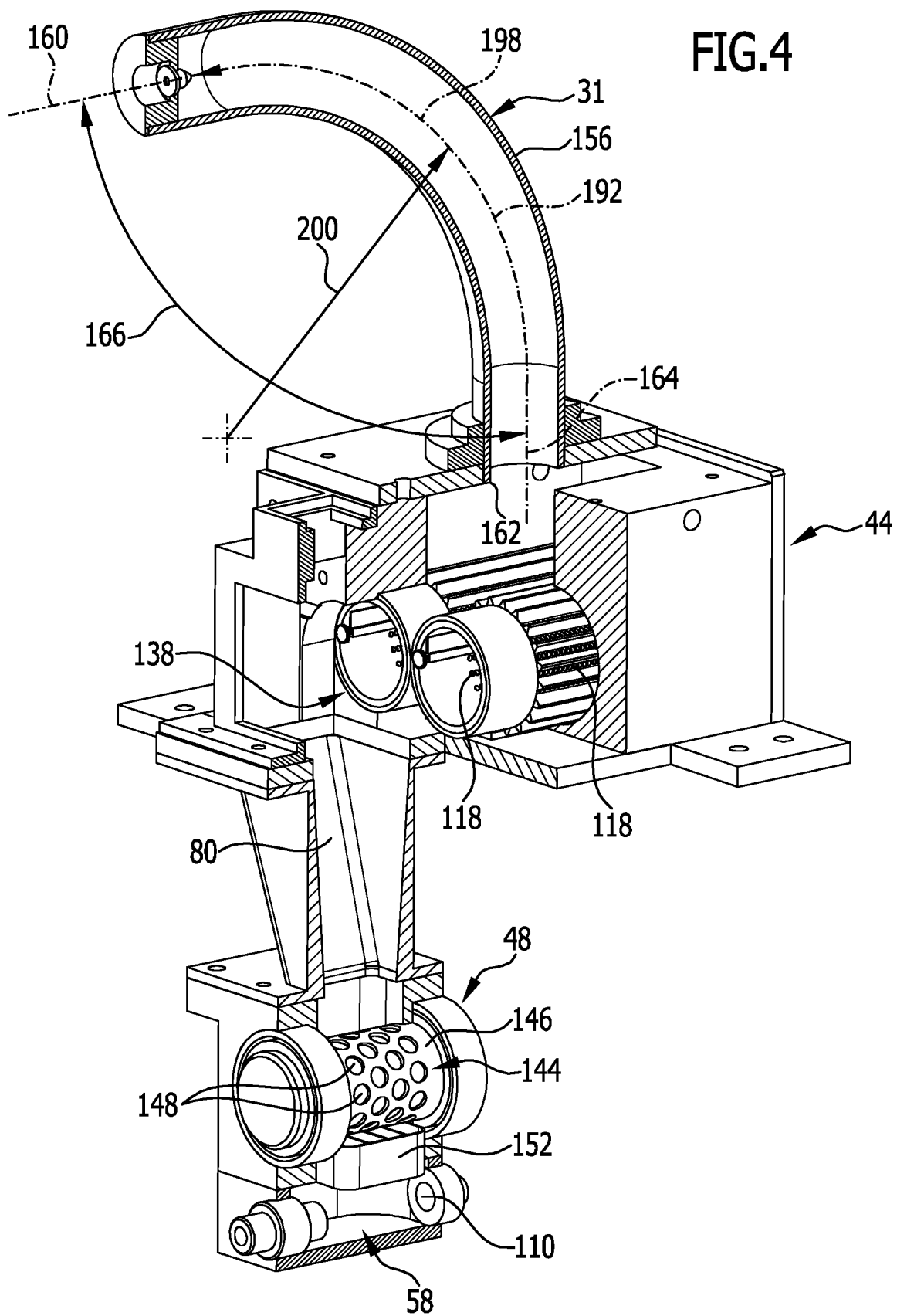
Figure 5:
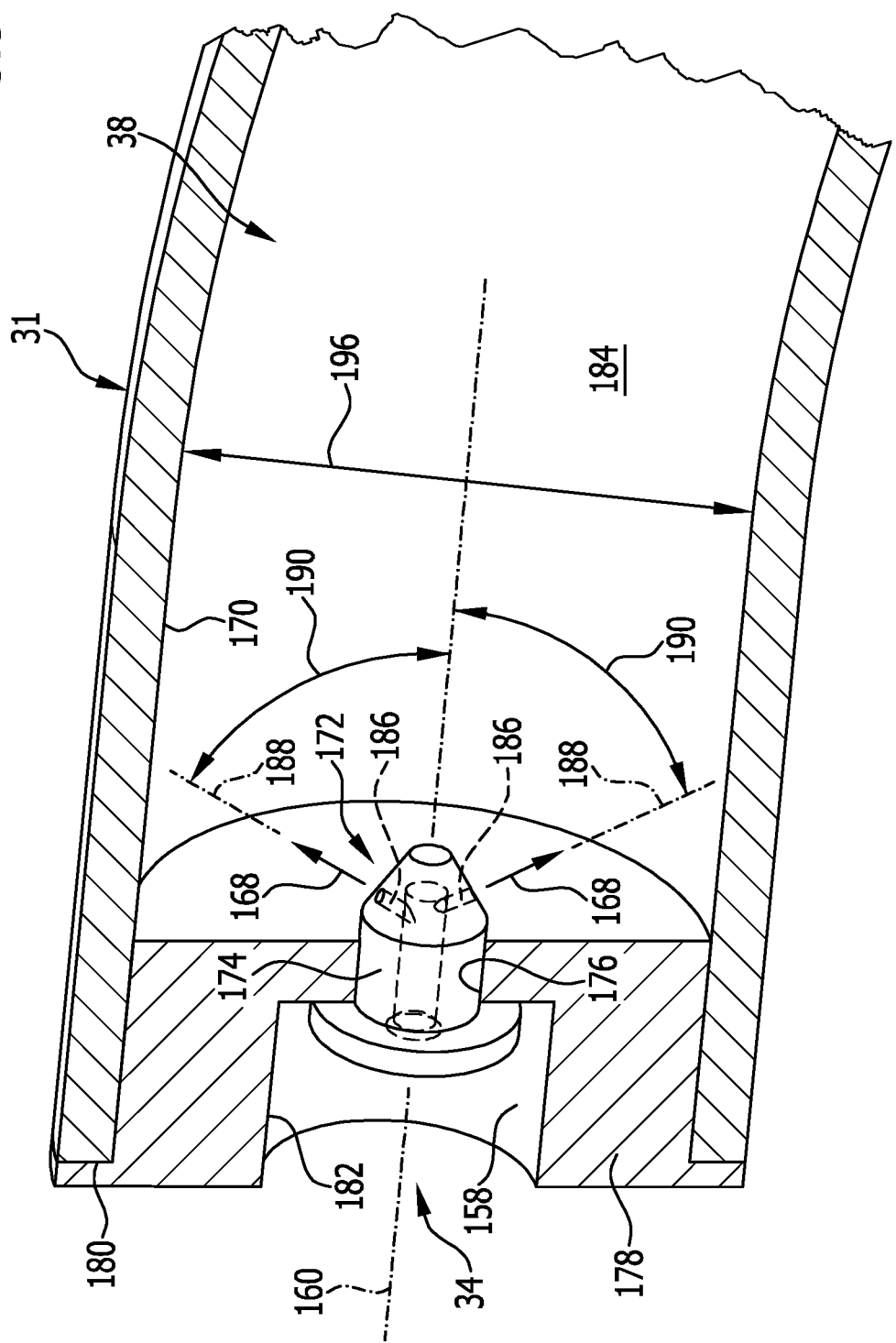
Figure 6:
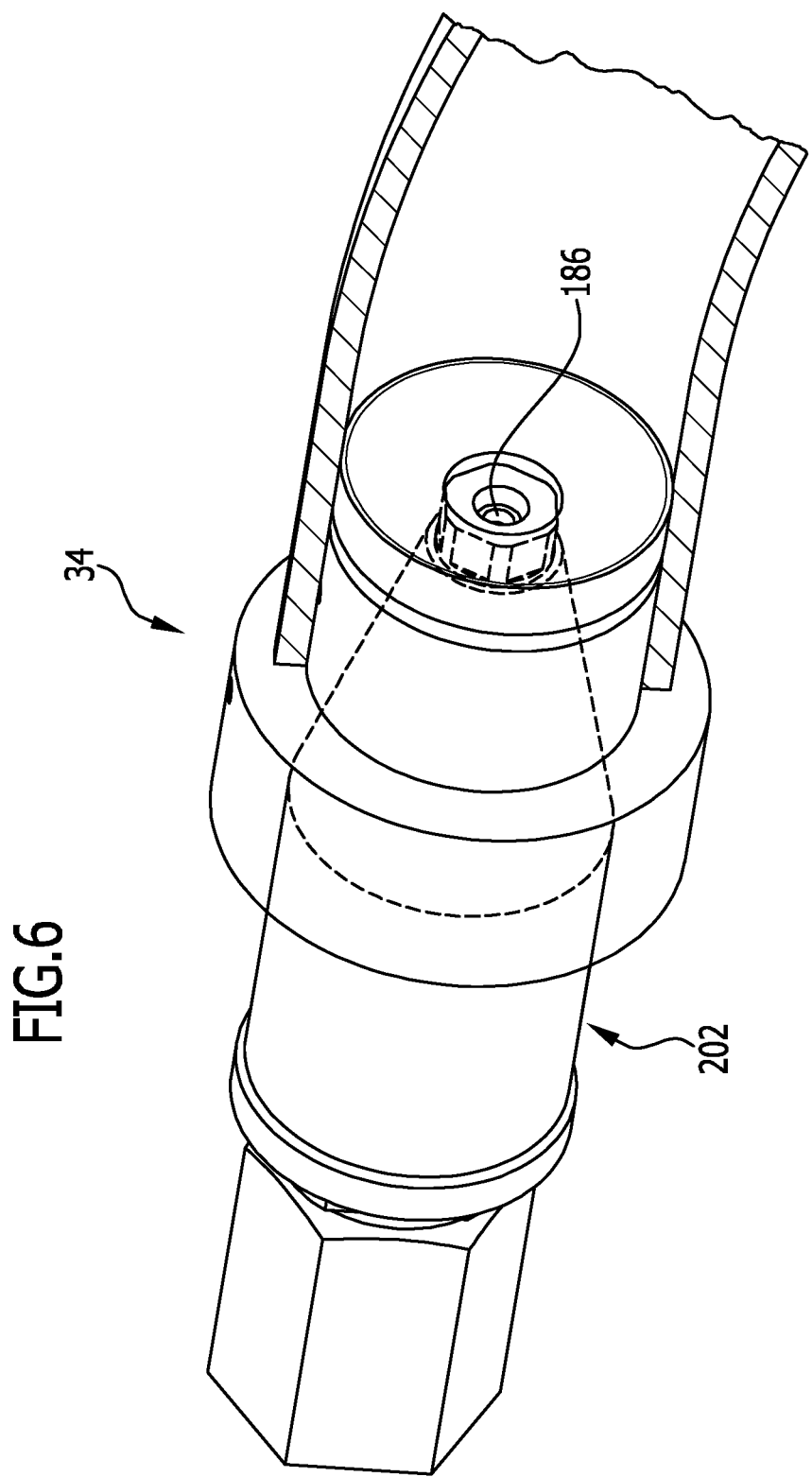
Figure 7:
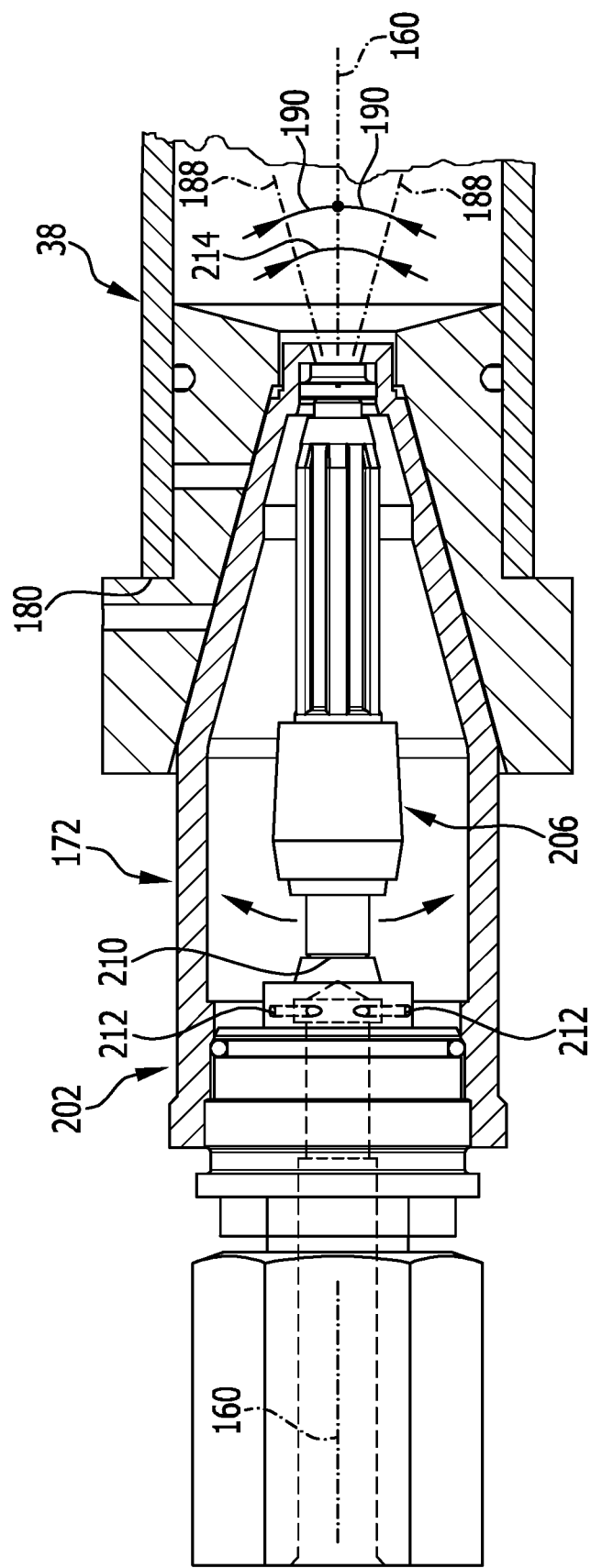

The foregoing summary and the following description may be better understood in conjunction with the drawing figures, of which:

FIG. 1: shows a schematic illustration of a cleaning device for blasting surfaces to be treated with a mixed-flow consisting of a compressed gas and $CO_2$ pellets;

FIG. 2: a further schematic illustration of a cleaning device for blasting surfaces to be treated with a mixed-flow consisting of a compressed gas and $CO_2$ pellets;

FIG. 3: a schematic, partly cut-away perspective illustration of a device for producing high-strength $CO_2$ pellets comprising a pre-compressing device and a main compressing device;

FIG. 4: a further perspective, partly sectional view of the arrangement depicted in FIG. 3;

FIG. 5: a schematic, partly sectional illustration of an exemplary embodiment of an expansion device;

FIG. 6: a perspective, partly cut-away view of a second exemplary embodiment of an expansion device;

FIG. 7: a partly sectional side view of the arrangement depicted in FIG. 6; and

Figure 8:
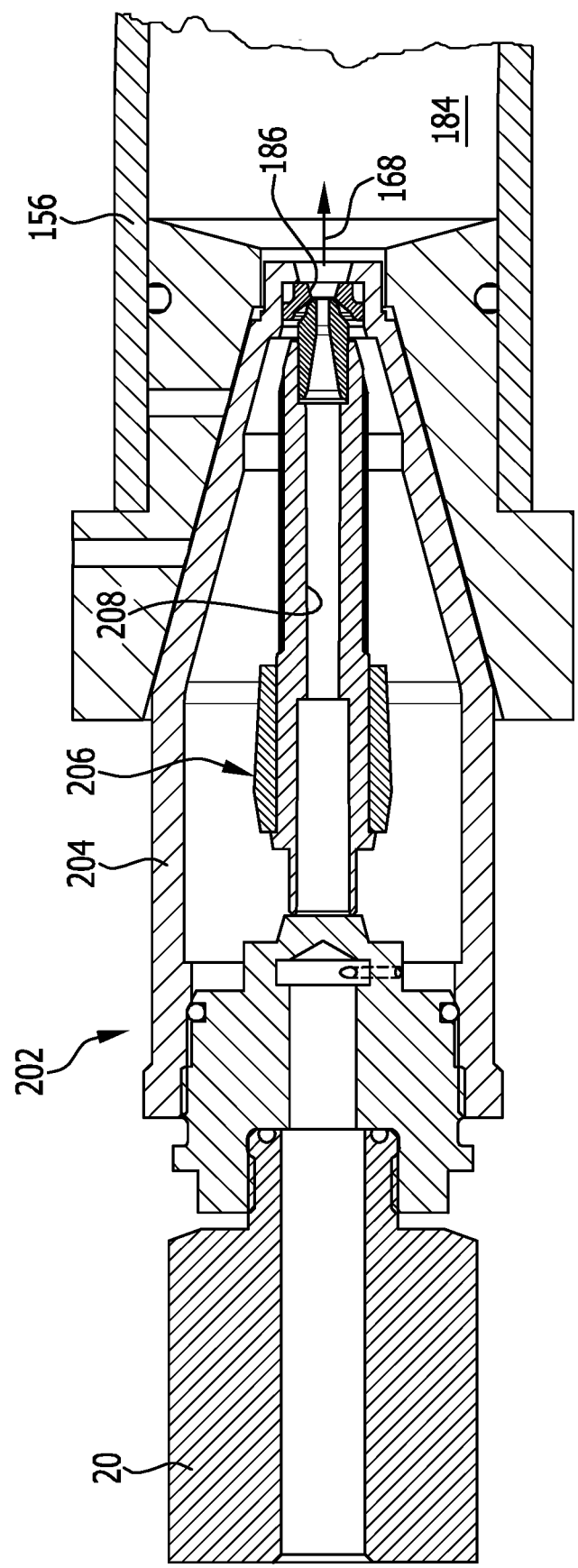

FIG. 8: a longitudinal sectional view of the arrangement depicted in FIG. 6.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a device for producing high-strength $CO_2$ pellets from $CO_2$ snow, in particular, for a cleaning device for blasting surfaces to be treated with a mixed-flow consisting of a compressed gas and $CO_2$ pellets, comprising a main compressing device for compressing $CO_2$ snow for forming $CO_2$ pellets, further comprising a pre-compressing device for pre-compressing $CO_2$ snow produced by expanding liquid $CO_2$, wherein the pre-compressing device is in the form of a fluid-mechanical pre-compressing device, wherein the pre-compressing device comprises an expansion device for producing $CO_2$ snow from liquid or gaseous $CO_2$ and a pre-compression chamber for receiving and pre-compressing the produced $CO_2$ snow and wherein the expansion device and the pre-compression chamber are connected to one another in fluidic manner.

The provision of a pre-compressing device in addition to the main compressing device in a device for producing high-strength $CO_2$ pellets has the particular advantage that the produced $CO_2$ snow which is formed by expanding liquid $CO_2$ for example is consolidated not only by the main compressing device, but has already been pre-compressed before reaching the main compressing device and can then be still further consolidated thereby. Thus, $CO_2$ pellets, also referred to as dry ice pellets, of significantly higher density can be manufactured in a simple manner compared with conventional devices for producing $CO_2$ pellets. However, the higher the density of the $CO_2$ pellets is, then so much the better their cleaning efficiency will be when subjecting a surface that is to be cleaned to the $CO_2$ pellets. In particular, if the pre-compressing device is in the form of a fluid-dynamics type pre-compressing device, also referred to as a fluid-mechanical pre-compressing device, then the constructional costs and layout on equipment for the construction of the device can, in particular, be significantly reduced. In the case of a fluid-mechanical pre-compressing device, one makes use of the fact that a desired compression of the $CO_2$ snow comes about due to a movement of the snow that results from the expansion of liquid $CO_2$ by suitable formation and orientation of a stream consisting of both the expanding liquid $CO_2$ and the produced $CO_2$ snow. This can be effected for example by an agglomeration of $CO_2$ snow in certain regions of the pre-compressing device, for example, on the internal wall surfaces thereof. Such a fluid-mechanical pre-compressing process can be achieved in a simple manner if the produced $CO_2$ snow does not move along a main axis of the pre-compressing device, but rather, along a path running inclined thereto so that a contact with an internal wall surface of the pre-compressing device is made possible. Thus, due alone to the flow of the produced $CO_2$ snow in the pre-compressing device, there results an agglomeration and pre-compression of the $CO_2$ snow which can then be further consolidated by the main compressing device into further high-strength $CO_2$ pellets of high density.

It is expedient if the pre-compressing device comprises an expansion device for producing $CO_2$ snow from liquid or gaseous $CO_2$ and a pre-compression chamber for receiving and pre-compressing the produced $CO_2$ snow and if the expansion device and the compression chamber are connected to one another in fluidic manner. When using such a pre-compressing device, $CO_2$ snow can first be produced by means of the expansion device. Due to the fluidic connection of the expansion device to the pre-compression chamber, the entire quantity of $CO_2$ snow that has been produced can be accommodated by the pre-compression chamber and can be further consolidated therein into pre-compressed $CO_2$ snow and then supplied to the main compressing device. In addition, due to the fluidic connection of the expansion device to the pre-compression chamber, the effect can also be achieved that there will be no blockage of the pre-compression chamber. Due to the forces effective therein, the following stream of $CO_2$ snow flowing under the pressure of the expanding liquid $CO_2$ into the pre-compression chamber is sufficient for example to loosen from an inner wall surface of the pre-compression chamber the agglomerated and thus pre-compressed $CO_2$ snow that has previously settled on this inner wall surface and thus too, to supply it to the main compressing device.

It is advantageous if the fluid-mechanical pre-compressing device is formed such as to produce a stream of gaseous $CO_2$ in the pre-compression chamber which is directed at least partly onto an inner wall surface of the pre-compression chamber. By forming the pre-compressing device in such a manner, this makes it possible on the one hand to produce an agglomeration of $CO_2$ snow on the inner wall surface. This is achieved in particular in that the $CO_2$ stream is directed at least partially onto the inner wall surface. On the other hand, it is precisely such a directed $CO_2$ stream that prevents there becoming an ever increasing agglomeration of $CO_2$ snow on the inner wall surface because the gaseous $CO_2$ stream also loosens the $CO_2$ snow that has already agglomerated there from the inner wall surface. Thus, $CO_2$ snow is pre-compressed on the one hand and blockage of the compression chamber due to a continuously increasing agglomeration of $CO_2$ snow is prevented on the other.

Preferably the fluid-mechanical pre-compressing device is formed such as to produce a helical or substantially helical gaseous $CO_2$ stream in the pre-compression chamber. This arrangement has the advantage that the liquid $CO_2$ will become partly gaseous due to the expansion process and the solidified $CO_2$ in the form of $CO_2$ snow can move along the defined flow through the pre-compression chamber. A helical stream of gaseous $CO_2$ and $CO_2$ snow then in turn causes a partial agglomeration of $CO_2$ snow on the inner wall surface on the one hand, but on the other hand, it cleanses the already pre-agglomerated $CO_2$ snow from the inner wall surface in order to prevent blockage of the pre-compression chamber. Due to this self-cleaning property of the proposed pre-compressing device, the device can also be used for producing $CO_2$ pellets in continuous operation.

Expediently, the expansion device comprises an expanding nozzle for expanding liquid or gaseous $CO_2$. Due to the expansion process, liquid or gaseous $CO_2$ can be cooled to such an extent that $CO_2$ snow develops.

It is advantageous if the expanding nozzle is arranged and formed for delivering liquid $CO_2$ into the pre-compression chamber. In this way, particularly in the case where the pre-compression chamber is sealed relative to the expansion device, water ice which could lead to a blockage of the pre-compression chamber can be prevented from forming in the pre-compression chamber.

In accordance with a further preferred embodiment of the invention, provision may be made for the pre-compression chamber to comprise an inlet defining an inlet longitudinal axis, for the expanding nozzle to comprise at least one nozzle outlet opening, for the nozzle outlet opening to define a nozzle outlet longitudinal axis and for the longitudinal axis and the nozzle outlet longitudinal axis to define between them an inlet angle which lies in a range of approximately 0° to 90°. Thus for example, liquid $CO_2$ can enter the pre-compression chamber parallel to the inlet longitudinal axis or transversely and in particular perpendicular thereto. Otherwise, any arbitrary orientation between these two extremes is possible. Thus in particular, helically shaped flows can be produced when the inlet angle lies between 0° and 90°, for example, when it amounts to approximately 45°.

Preferably, the nozzle outlet longitudinal axis and the inlet longitudinal axis intersect one another or are skewed relative to each other or run parallel to each other. The expanding nozzle can be arranged accordingly with its nozzle outlet arranged in such a manner that the nozzle outlet longitudinal axis and the inlet longitudinal axis define the mutual relative paths described.

In order to achieve movement of the produced $CO_2$ snow along a curved path of movement in a simple manner, it is advantageous if the expanding nozzle is in the form of a swirl or a rotor nozzle. A swirl nozzle defines a substantially unchanging flow of $CO_2$ snow into and through the pre-compression chamber. In the case of a rotor nozzle, a direction of flow constantly changes both when flowing into the pre-compression chamber as well as when flowing through it. Thus in particular, blockage of the pre-compression chamber can be prevented very effectively with a rotor nozzle since $CO_2$ snow cannot always settle at the same locations of the inner wall surface of the pre-compression chamber.

The device can be formed particularly economically and in a simple manner if the pre-compression chamber is in the form of a pipe. A pipe can, in particular, have a circular, oval or polygonal cross section. Such pipes can be manufactured in a simple manner and in addition, an expansion device and a main compressing device can be interconnected in fluidic manner in a simple way.

Preferably, the pre-compression chamber defines a longitudinal axis. Thus in particular, the pre-compression chamber can be formed in a completely straight-line. In such a case, the expansion device is preferably formed in such a manner that a $CO_2$ stream flowing into the pre-compression chamber does not run parallel to the longitudinal axis of the pre-compression chamber, but rather, transversely thereto. In particular, a helical or winding path of movement of the created $CO_2$ snow is advantageous in order to achieve pre-compression of $CO_2$ snow within the pre-compression chamber in the manner described.

It is advantageous if the compression chamber is curved. Thus in particular, it can be in the form of a curved pipe. In particular in the case of a curved pre-compression chamber, it is possible to orient the expanding nozzle in such a way that its nozzle outlet longitudinal axis runs parallel to the inlet longitudinal axis, i.e. $CO_2$ snow is produced inside the pre-compression chamber and can initially flow coaxially relative to the pre-compression chamber. Then, due to the curvature of the pre-compression chamber, the $CO_2$ snow can strike a curved inner wall surface of the pre-compression chamber and thereby agglomerate into pre-compressed $CO_2$ snow. In addition, if an inner wall surface of the pre-compression chamber is completely edge-free, then blockage of the pre-compression chamber can be prevented in a simple manner. Should just a flat impact surface directed against the $CO_2$ stream be provided as the agglomeration region, then the risk of blockage would be significantly increased during the operation of the device.

It is expedient if the outlet longitudinal axis and the inlet longitudinal axis include between them a chamber angle which lies in a range of approximately 0° to approximately 180°, in particular, in a range of approximately 45° to 135°. Preferably, the chamber angle amounts to approximately 90°. For example, a chamber angle of 0° results in the case of a pre-compression chamber in the form of a pipe extending in a straight line. A chamber angle of 180° can ensue due to a substantially U-shaped pre-compression chamber which can be bent, in particular, from a pipe. A chamber angle of 90° corresponds to a pre-compression chamber which has a curved main axis, in particular, in the form of a quarter circle or a quarter ellipse.

Furthermore, it can be expedient if the pre-compression chamber has a diameter and a length and if a ratio between the length and the diameter lies in a range of approximately 4:1 to approximately 20:1. In particular the ratio can lie in a range of approximately 6:1 to approximately 14:1. Further in particular, the ratio can amount to approximately 7.5:1. To manufacture a pre-compression chamber in the manner described makes it possible to achieve particularly efficient pre-compression of the $CO_2$ snow.

In order to achieve optimal pre-compression of $CO_2$ snow in the pre-compression chamber and effectively prevent blockage thereof at the same time and thus enable the device to operate continuously, it is advantageous if the pre-compression chamber has a radius of curvature and if a ratio between the radius of curvature and the diameter lies in a range of approximately 2:1 to approximately 10:1. In particular, the ratio can lie in a range of approximately 2:1 to approximately 6:1. Further in particular, the ratio can amount to approximately 2.4:1.

It is advantageous if the pre-compressing device comprises a mechanical pre-compressing device having at least one movable pre-compressing element for compressing the produced $CO_2$ snow in the pre-compression chamber. In particular, the at least one pre-compressing element can be provided alternatively or additionally to the fluid-mechanical formation of the pre-compressing device. $CO_2$ snow can be pre-compressed in a defined way with the at least one movable pre-compressing element so that it can be supplied pre-compressed to the main compressing device. A separate drive can be provided for moving the pre-compressing element.

A mechanical pre-compressing device can be formed in a simple manner if the at least one pre-compressing element is in the form of a pressure member, in particular, in the form of a stamp or a piston or in the form of a roller.

Furthermore, it is expedient if the pre-compressing device comprises a $CO_2$ connector for connecting to a source of $CO_2$ which contains liquid $CO_2$. This arrangement makes it possible in particular for the device to be used in conjunction with a mobile cleaning device.

Preferably, the $CO_2$ connector is connected in fluidic manner to the expansion device, in particular to the expanding nozzle. $CO_2$ snow can thus be produced in a simple manner.

It is advantageous if the device comprises a source of $CO_2$ containing liquid $CO_2$ which is connected to the pre-compressing device in fluidic manner. In particular, a device for mobile operation or employment can be formed in this way.

The device can be formed and employed in a simple and economical manner if the source of $CO_2$ is a pressurised container containing liquid $CO_2$. Liquid $CO_2$ can thus be stored simply and economically and can be used for a mobile device for the production of pellets.

Liquid $CO_2$ can be fed to the pre-compressing device in a simple manner if the source of liquid $CO_2$ is connected in fluidic manner to the pre-compressing device by a feeder line.

In accordance with a further preferred embodiment of the invention, provision may be made for the main compressing device to be in the form of an extruding device. $CO_2$ pellets having, in particular, a defined cross-sectional area can be manufactured with the aid of such an extruding device.

Expediently, the extruding device comprises at least one extrusion matrix incorporating a plurality of apertures. A plurality of $CO_2$ strands for forming $CO_2$ pellets can thus be produced at the same time. Hereby, it is particularly advantageous if the at least one extrusion matrix is arranged to be rotatable. For example, it can be part of a compressor wheel and/or a corresponding pick-up wheel that is still to be described in the following. A gear wheel compressor incorporating an extruding device can thus be formed in a particularly simple and compact way. In particular, the extrusion matrix can be arranged or formed on the compressor wheel and/or on the pick-up wheel so that $CO_2$ pellets can for example be manufactured by a radial extrusion process, in particular, from outside to inside in the direction of a rotational axis of the compressor wheel or the pick-up wheel in that $CO_2$ snow is compressed through suitably shaped apertures which are connected in fluidic manner to snow pick-ups formed on the compressor wheel and on the pick-up wheel for example. The extrusion matrix can thus be integrated, in particular, in the respective outwardly toothed gear wheels formed in the compressor wheel and/or the pick-up wheel. In particular, the gear wheels can have inclined teeth. For example, the apertures can pass through compressing elements, thus for example, the teeth of the gear wheels. As an alternative or in addition, it is also possible for apertures to be provided which pass through the compressor wheel and/or the pick-up wheel between neighbouring compressing elements and open out directly into snow pick-ups. This can be realized in particular in that the apertures end at an outer surface of the compressor wheel or the pick-up wheel between the teeth thereof.

Preferably, the extruding device is in the form of a gear wheel compressor. As already described hereinabove, $CO_2$ pellets can thereby be extruded in stranded form in a simple manner and in a continuous process.

The device can be formed in a particularly simple and compact manner if the gear wheel compressor comprises at least one compressor wheel having a plurality of compressing elements that is mounted such as to be rotatable about a first axis of rotation and at least one pick-up wheel that is mounted such as to be rotatable about a second axis of rotation and cooperates with the at least one compressor wheel and which incorporates a plurality of snow pick-ups for receiving $CO_2$ snow that are formed in correspondence with the compressing elements. In particular, the compressor wheel and the pick-up wheel can be formed identically and thereby also exercise identical functions at the same time. In addition, a drive which propels the compressor wheel and/or the pick-up wheel can be provided for the functioning of the gear wheel compressor. If the compressor wheel and the pick-up wheel are helical gears, then one has teeth with a left-hand flute and the other with a right-hand flute.

The construction of the device can be further simplified if the first and the second axis of rotation run parallel or substantially parallel to each other.

Expediently, the plurality of compressing elements are in the form of teeth which project from the compressor wheel in the radial direction and/or the plurality of snow pick-ups are in the form of recesses which open in the radial direction. For example, conventional gear wheels can be used for forming the compressor wheel. In particular, two or more compressor wheels could also be employed. For example, their teeth can be arranged such as to be offset in the circumferential direction so that the teeth of neighboring gear wheels are arranged at the level of the interdental spaces. In addition, the teeth of the compressor wheel can intermesh in a simple manner with the teeth of the pick-up wheel, whereby the snow pick-ups are formed between the teeth of the pick-up wheel. Thus, due in particular to the identical construction of the compressor wheel and the pick-up wheel, a function of both wheels can also be combined as previously mentioned.

The construction and the production of the device are particularly simple if the at least one compressor wheel and the at least one pick-up wheel are formed identically or substantially identically. For example, the at least one compressor wheel and the at least one pick-up wheel can be in the form of identical gear wheels, whereby each of the interdental spaces between the teeth of the gear wheels forming compressing elements form snow pick-ups. In addition thereby, a particularly compact device for producing $CO_2$ pellets from $CO_2$ snow can also be formed.

Furthermore, it is advantageous if each of the plurality of apertures defines a longitudinal axis which extends away from the first or second axis of rotation in the radial direction or substantially in the radial direction. Thus in particular, a cylindrical extrusion matrix can thereby be formed. In particular, due to the arrangement of the apertures, it is possible for the compressing elements to press the $CO_2$ snow in the snow pick-ups through the apertures provided therefor.

Preferably, each snow pick-up is connected in fluidic manner to at least one aperture. This is possible, in particular, if the aperture opens out into the snow pick-up or if the aperture passes through a compressing element, which compressing element cooperates with a snow pick-up. If each snow pick-up is connected in fluidic manner to exactly one aperture, then exactly one $CO_2$ pellet can be formed by the cooperation of a compressing element and a snow pick-up when they inter-engage. The number of the compressing elements distributed over the periphery of the compressor wheel as well as of the snow pick-ups of the pick-up wheel that are distributed over the periphery thus determines the number of the $CO_2$ pellets that are formable per revolution of the compressor wheel or the pick-up wheel.

It is advantageous if the compressor wheel comprises a compressor wheel sleeve having a compressor wheel sleeve wall and if the compressing elements are arranged or formed on an outer surface of the compressor wheel sleeve. In this way, the gear wheel compressor can be made particularly light, i.e. be of low weight. In addition, an interior space defined by the compressor wheel sleeve can serve for accommodating the manufactured $CO_2$ pellets.

It is expedient if the pick-up wheel comprises a pick-up wheel sleeve having a pick-up wheel sleeve wall and if the snow pick-ups are arranged or formed in the pick-up wheel sleeve wall. A continuously operable main compressing device can thus be formed in a simple manner.

For simple automatic operation of the device, it is expedient if it comprises a drive device for propelling the at least one compressor wheel and/or the at least one pick-up wheel. The at least one compressor wheel and/or the at least one pick-up wheel can be propelled by the drive device and optionally $CO_2$ snow can also be conveyed between them. In particular, the drive device can be constructed as an external synchronous drive which propels both the compressor wheel and the pick-up wheel, namely, in such a manner that the cooperating compressing elements and snow pick-ups do not touch each other, i.e. a clearly-defined gap is formed between them.

It is expedient if the device comprises a stripping device for stripping the formed $CO_2$ pellets off the at least one compressor wheel and/or off the at least one pick-up wheel. In particular, the stripping device can be arranged or formed in such a manner that the $CO_2$ strands formed by the compressing device are separated for forming $CO_2$ pellets of substantially equal length for example.

It is advantageous if the stripping device comprises at least one stripping element which is arranged or formed in a compressor wheel sleeve interior space that is defined by the compressor wheel sleeve or in a pick-up wheel sleeve interior space that is defined by the pick-up wheel sleeve or which projects at least partly into said interior spaces. This design makes it possible in particular to form $CO_2$ pellets that are extruded through the compressor wheel sleeve or through the pick-up wheel sleeve by stripping an extruded $CO_2$ strand with the at least one stripping element. In particular for example, the at least one stripping element can be arranged or formed to be rotatable about a longitudinal axis which runs parallel to or substantially parallel to a longitudinal axis of the compressor wheel or the pick-up wheel.

It is expedient if the at least one stripping element comprises a stripping edge which touches or almost touches a compressor wheel sleeve inner surface of the compressor wheel sleeve that delimits the compressor wheel sleeve interior space or which touches or almost touches a pick-up wheel sleeve inner surface of the pick-up wheel sleeve that delimits the pick-up wheel sleeve interior space. $CO_2$ pellets which, for example, are extruded through an aperture of the compressor wheel sleeve or an aperture of the pick-up wheel sleeve can be stripped in a simple and safe way by such a stripping edge. The length of the $CO_2$ pellets that are to be manufactured can thus be set in dependence on the positioning of the stripping element or the stripping edge thereof.

It is advantageous if the main compressing device comprises a pellet outlet for delivering $CO_2$ pellets. In particular, this can be aligned in parallel with the first or second axis of rotation or can run transversely and in particular perpendicularly to the first or second axis of rotation. The first mentioned alignment of the pellet outlet is then advantageous in particular if the device comprises an extruding device. If the $CO_2$ pellets are formed by the at least one compressor wheel and the at least one pick-up wheel cooperating therewith, then the arrangement or orientation of the pellet outlet transverse to the first or second axis of rotation is particularly expedient.

Preferably, the pellet outlet is arranged or formed below the main compressing device in the direction of the force of gravity. The manufactured $CO_2$ pellets can thereby emerge from the main compressing device due to the working of gravity alone.

It is expedient if the pellet outlet is connected in fluidic manner to an intermediate storage device for the intermediate storage of the pellets $CO_2$ that have been produced. The intermediate storage device makes it possible in particular to always keep sufficient $CO_2$ pellets available both in the case of an intermittent production process of the $CO_2$ pellets as well as in the case of an intermittent process of blasting the $CO_2$ pellets.

In accordance with a further preferred embodiment of the invention provision may be made for the pellet outlet or the intermediate storage device to be connected in fluidic manner to a transfer device for conveying $CO_2$ pellets that have been produced into a $CO_2$ pellet accelerating device for the purposes of accelerating them. The proposed arrangement makes it possible in particular for the device for producing $CO_2$ pellets to operate continuously when employed in conjunction with a cleaning device. Intermittent operation of the device is also possible, in particular, when an intermediate storage device is provided.

It is expedient if the device comprises a pressure separating device for forming a pressure stage between the expansion device and the pellet outlet. In particular, it is advantageous if the pressure separating device is arranged or formed between the compressing device and the accelerating device. For example, pressures significantly higher than atmospheric pressure can prevail in the region of the pressure separating device in order to form $CO_2$ snow by expansion of the gas. Preferably, atmospheric pressure prevails at the pellet outlet. The $CO_2$ pellets can thereby be conveyed without special difficulties into an intermediate storage device or directly into a $CO_2$ pellet accelerating device for example. In order to prevent high pressures from building up in particular in the pre-compressing device, an over-pressure valve can optionally be provided in the pre-compressing device and in particular on the pre-compression chamber for defining a maximum prevailing pressure in the compression chamber.

It is advantageous if the pressure separating device comprises at least one gas-tight or substantially gas-tight sealing element and if the at least one sealing element is arranged between the expansion device and the pellet outlet. The sealing element can, in particular, be in the form of a seal of synthetic material which is formed on the at least one compressor wheel and/or on the at least one pick-up wheel.

The pressure separating device can be formed in a particularly simple manner if the at least one sealing element is in the form of $CO_2$ snow, in particular, compressed $CO_2$ snow. In this way, the pre-compressed $CO_2$ snow that is to be converted into $CO_2$ pellets exercises a dual function. It serves not only as the raw material for forming high-strength $CO_2$ pellets of high density, but also seals, in particular, the at least one compressor wheel and the at least one pick-up wheel with respect to each other so that a pressure separating device is formed between the expansion device and the pellet outlet.

Preferably, the at least one sealing element is arranged or formed between the at least one compressor wheel and the at least one pick-up wheel. Thus, the gear wheel compressor can also form the pressure separating device or a part thereof, in particular, when the at least one sealing element is formed from $CO_2$ snow.

Furthermore, the invention relates to a cleaning device for blasting surfaces to be treated with a mixed-flow consisting of a compressed gas and $CO_2$ pellets, further comprising a device for producing high-strength $CO_2$ pellets from $CO_2$ snow, said device for producing high-strength $CO_2$ pellets comprising a main compressing device for compressing $CO_2$ snow for forming $CO_2$ pellets, further comprising a pre-compressing device for pre-compressing $CO_2$ snow produced by expanding liquid $CO_2$, wherein the pre-compressing device is in the form of a fluid-mechanical pre-compressing device, wherein the pre-compressing device comprises an expansion device for producing $CO_2$ snow from liquid or gaseous $CO_2$ and a pre-compression chamber for receiving and pre-compressing the produced $CO_2$ snow and wherein the expansion device and the pre-compression chamber are connected to one another in fluidic manner It is possible to treat surfaces by blasting them with a mixed-flow consisting of a compressed gas such as compressed air for example and $CO_2$ pellets with the aid of such a cleaning device. The $CO_2$ pellets of high density that are employed for this purpose can be produced directly in or by the cleaning device. This makes it possible to employ a minimum quantity of liquid $CO_2$ or $CO_2$ gas for producing $CO_2$ snow as the raw material for forming the $CO_2$ pellets.

It is advantageous if the cleaning device comprises a $CO_2$ connector for connecting a source of $CO_2$ which contains liquid $CO_2$ or a source of $CO_2$ containing liquid $CO_2$. This arrangement makes it possible for example to use the device in conjunction with a mobile cleaning device.

Expediently, the cleaning device comprises a compressed gas connector for connecting a compressed gas producing device or a compressed gas producing device. Depending on whether the device is employed in a region where a compressed gas connection is available or not, then compressed gas can respectively be used or produced for forming a mixed-flow consisting of compressed gas and $CO_2$ pellets in the simplest of manners.

Preferably, the cleaning device comprises a transfer device for transferring the high-strength $CO_2$ pellets that have been produced by the device into a $CO_2$ pellet accelerating device for the purposes of accelerating them. For example, $CO_2$ pellets from the main compressing device or an intermediate storage device can be passed on by means of the transfer device in such a manner that they are accelerated before delivery into a compressed gas stream or they are accelerated by the stream for the purposes of forming a mixed-flow consisting of compressed gas and $CO_2$ pellets.

In order to obtain as good a cleaning effect as possible, it is advantageous if the $CO_2$ pellets strike the surfaces that are to be treated at a high speed. To this end, it is expedient if the cleaning device comprises a $CO_2$ pellet accelerating device. This can comprise, in particular, a compressed gas line which is connected to the compressed gas connector or the compressed gas producing device in fluidic manner. If compressed gas is fed through the compressed gas line, then $CO_2$ pellets introduced into the line can be accelerated in a simple and defined manner. The speed of the $CO_2$ pellets can be adjusted in particular by the flow rate of the compressed gas or the pressure prevailing in the compressed gas line.

It is advantageous if the transfer device and/or the $CO_2$ pellet accelerating device comprises at least one venturi tube. The at least one venturi tube produces a negative pressure which, in particular, can suck $CO_2$ pellets into the compressed gas line if the venturi tube is connected in fluidic manner to the compressed gas line or forms a part thereof.

In accordance with a further preferred embodiment of the invention, provision may be made for the transfer device to comprise downstream thereof a jet outlet connector for connecting to a jet line or for the transfer device to be connected downstream thereof in fluidic manner to a jet line. Thus for example, a jet line can be attached to the cleaning device in order to lead the mixed-flow to exactly where it is needed.

Preferably, a jet nozzle is arranged or formed at a free end of the jet line. The mixed-flow can then be bundled or focused in a defined manner in order for example to treat surfaces very precisely to clean of dirt for example.

It is advantageous if the cleaning device comprises a $CO_2$ pellet intermediate storage device for intermediate storage of the $CO_2$ pellets that have been produced. The processes of producing and deploying the $CO_2$ pellets by means of the jet nozzle for example can then be kept completely separate from each other. In particular thereby, both intermittent operation in the production of the $CO_2$ pellets as well as intermittent operation when extracting the $CO_2$ pellets through the jet line or the jet nozzle are possible. The $CO_2$ pellet intermediate storage device thus serves as a buffer store.

It is expedient if the $CO_2$ pellet intermediate storage device is connected in fluidic manner directly or indirectly to the main compressing device on the one hand and to the transfer device on the other. Cumbersome transportation of the $CO_2$ pellets can then be substantially dispensed with. For example, the $CO_2$ pellet intermediate storage device can be arranged in such a manner that the $CO_2$ pellets from the main compressing device fall directly into the $CO_2$ pellet reservoir through an inlet of the $CO_2$ pellet intermediate storage device and, on the other hand, are removed through an appropriate outlet and, in particular, passed on directly or indirectly to the transfer device.

A cleaning device bearing the overall reference symbol 10 for blasting surfaces to be treated with a mixed-flow 12 consisting of a compressed gas 14 and $CO_2$ pellets 16 is illustrated schematically in FIG. 1.

The cleaning device 10 comprises a housing 18 on which there is arranged a $CO_2$ connector 20 which is connected by a $CO_2$ line 22 to a $CO_2$ reservoir 24 in the form of a $CO_2$ compressed gas cylinder for example. This can contain in particular liquid $CO_2$. A valve assembly 28 comprising at least one valve is connected downstream of an outlet 26 of the $CO_2$ reservoir 24 in order to feed liquid $CO_2$ from the $CO_2$ reservoir 24 through the $CO_2$ line 22.

The $CO_2$ connector 20 is connected in fluidic manner via a feeder line 30 to a pre-compressing device 31. The pre-compressing device 31 comprises an expansion device 34 and a pre-compression chamber 38 which is connected in fluidic manner thereto. The feeder line 30 is connected in fluidic manner to an expanding nozzle 32 of the expansion device 34. The liquid $CO_2$ is expanded by the expanding nozzle 172 and forms $CO_2$ snow 36 which collects in the pre-compression chamber 38 and is pre-compressed by an agglomeration process. The $CO_2$ snow is passed on by a stream of $CO_2$ gas and $CO_2$ snow 36.

Optionally, the cleaning device 10 may further comprise a separating device 40 in order to separate the produced $CO_2$ snow 36 from non-solidified $CO_2$ gas.

Furthermore, the cleaning device 10 comprises a device 42 for producing high-strength $CO_2$ pellets 16 from $CO_2$ snow 36 which comprises the pre-compressing device 31 and a main compressing device 44 for compressing $CO_2$ snow 36 for forming $CO_2$ pellets 16. The main compressing device 44 is constructed in the form of a gear wheel compressor 46.

The thus formed $CO_2$ pellets 16 are passed on to a transfer device 48 which is connected in fluidic manner via a compressed gas line 50 to a compressed gas connector 52. The latter can be connected to an external source of compressed gas 54 which makes the compressed gas such as compressed air for example available. Optionally, the cleaning device 10 can also comprise a source of compressed gas 56 such as a compressed air bottle or a compressor for producing compressed air at a desired pressure for example.

After the transfer device 48, a mixed-flow 12 is formed by the compressed gas and the $CO_2$ pellets 16 contained therein. The $CO_2$ pellets 16 are accelerated by the compressed gas in the mixed-flow 12 by means of an accelerating device 58. The accelerating device 58 is connected in fluidic manner via a line 60 to a jet outlet connector 62 that is arranged downstream thereof. A jet line 64 can be optionally attached to the jet outlet connector 62 or be permanently attached thereto. At a free end of the jet line 64, there is optionally arranged a jet nozzle 66 which may optionally comprise a valve 68 for regulating the shape and/or the strength of a particle jet 70 which is being emitted from the jet nozzle 66 and comprises the $CO_2$ pellets 16 that are being moved by the compressed gas.

Optionally, the cleaning device 10 can be mobile and have a chassis 74 comprising at least three wheels 72. Optionally, the cleaning device 10 can have a drive 76 for propelling at least one wheel 72.

Furthermore, the cleaning device 10 can have a holding device 78 for accommodating one or more $CO_2$ reservoirs 24. Overall, the cleaning device 10 can be constructed in such a way that it can be operated completely independently of external current and $CO_2$ supplies or sources of compressed gas.

Optionally an intermediate storage device 80 for $CO_2$ pellets can be formed or arranged between the main compressing device 44 and the transfer device 48.

The compressing device 44 also comprises in particular a transfer device 82 for conveying pre-compressed $CO_2$ snow 36 from the pre-compressing device 31 or the separating device 40 to the gear wheel compressor 46.

Optionally, the main compressing device 44 can comprise an extruding device 84 for extruding the $CO_2$ pellets 16.

The functioning of the device 10 and in particular of the pre-compressing device 31 thereof and the main compressing device 44 thereof is described in more detail in the following in conjunction with FIGS. 2 to 5.

The gear wheel compressor 46 comprises a compressor wheel 86 which is rotatable about a first axis of rotation 88 and a pick-up wheel 92 which is rotatable about a second axis of rotation 90. The compressor wheel 86 and the pick-up wheel 92 are substantially identical and each has a plurality of teeth 94 which form the compressing elements 96. Snow pick-ups 98 are formed between the teeth 94.

The compressor wheel 86 and the pick-up wheel 92 are arranged in such a manner that the first axis of rotation 88 and the second axis of rotation 90 run parallel to each other and the teeth 94 engage in the snow pick-ups 98 preferably without touching them. A drive 100 serves for setting the compressor wheel 86 and/or the pick-up wheel 92 into rotation. As schematically illustrated in FIG. 2, the compressor wheel 86 rotates in the direction of the arrow 102 i.e. in the clockwise direction, the pick-up wheel 92 rotates in the direction of the arrow 104, i.e. counter-clockwise.

The teeth 94 of the compressor wheel 86 and the pick-up wheel 92 carry $CO_2$ snow 36 from the pick-up container 38 along therewith, whereby each tooth 94 then compresses the $CO_2$ snow 36 accommodated in a snow pick-up 98 into the snow pick-ups 98 when the teeth 94 intermesh.

The compressor wheel 86 and the pick-up wheel 92 are not of solid construction, but respectively comprise a compressor wheel sleeve 112 and a pick-up wheel sleeve 114 from which the teeth 94 project away from the respective axes of rotation 88 and 90 in the radial direction.

The gear wheel compressor 46 illustrated exemplarily in FIG. 2 comprises an extruding device 84. This comprises two extrusion matrices 116 that are formed by a plurality of apertures 118 which pass through the compressor wheel sleeve 112 and the pick-up wheel sleeve 114 respectively. The apertures 118 are in the form of borings 120 which extend away from the respective axes of rotation 88 and 90 in the radial direction. In the case of the compressor wheel 86 and the pick-up wheel 92 that are illustrated in FIGS. 2 to 4, a plurality of apertures 118 are formed next to each other in the snow pick-ups 98 or open out into them.

The oppositely rotatable and mutually cooperating compressor wheel 86 and pick-up wheel 92 collect $CO_2$ snow 36 from the pick-up container 38 in the snow pick-ups 98. In the case of the gear wheel compressor 46, the pre-compressed $CO_2$ snow 36 is compressed through the apertures 118 so that high-strength $CO_2$ pellets 16 are formed that is to say, by extrusion, namely through the pick-up wheel sleeve 114 inwardly into a pick-up wheel sleeve interior space 132 or through the compressor wheel sleeve 112 into a compressor wheel sleeve interior space 128.

In order to form $CO_2$ pellets 16 of constant length, there is optionally provided a stripping device 122 which comprises one or two stripping elements 124 that can be arranged respectively in the interior of the pick-up wheel sleeve 114 and the compressor wheel sleeve 112. The stripping elements 124 have a stripping edge 126 which touches or almost touches a compressor wheel sleeve inner surface 130 that bounds the compressor wheel sleeve interior space 128 and/or touches or almost touches a pick-up wheel sleeve inner surface 134 that bounds the pick-up wheel sleeve interior space 132. The $CO_2$ pellets 16 that have been pressed through the apertures 118 are thereby stripped. The stripping elements 124 are fixed to the device 42, i.e. they do not rotate with the compressor wheel 86 or the pick-up wheel 92.

In the case of the gear wheel compressor 46, the compressing elements 96 and the snow pick-ups 98 form cooperating piston cylinder assemblies in which pre-compressed $CO_2$ snow 36 is formed into $CO_2$ pellets 16.

The compressed $CO_2$ pellets emerge from a respective open end of the compressor wheel sleeve 112 and the pick-up wheel sleeve 114 of the gear wheel compressor 46. The shape and size of the $CO_2$ pellets 16 produced in such a way are substantially identical and depend in essence on how the stripping device 122 is formed and arranged.

The $CO_2$ pellets 16 that have been produced fall downwardly in the direction of the force of gravity into the intermediate storage device 80 which can also be optionally omitted. It can be formed of various sizes.

The intermediate storage device 80 is connected in fluidic manner to the transfer device 48 to which in turn the accelerating device 58 which comprises a venturi tube 108 is attached.

The transfer device 48 is in the form of a segregating device 142 which is formed as a roller dispenser 144. It comprises a roller 146 which is provided with a plurality of recesses 148 on an outer surface thereof which each serve to accommodate an individual $CO_2$ pellet. The roller 146 is closed laterally on both sides by wall regions of the transfer device 48 that are matched to the outer surface so that $CO_2$ pellets can be picked up by the roller 146 from above and passed on again downwardly in the direction of the force of gravity.

The $CO_2$ pellets 16 fall onto the roller 116 from the intermediate storage device 80 in the direction of the force of gravity. The roller is rotated about its longitudinal axis 150 by means of a drive that is not illustrated in greater detail and thereby conveys the $CO_2$ pellets 16 in a defined manner to the accelerating device 58. Furthermore, the segregating device 142 comprises a grating shaft 152 incorporating a plurality of apertures 154 which is located downstream of the roller 146 in order to prevent insofar as possible an agglomeration of the highly compressed $CO_2$ pellets 16 before they enter the accelerating device 58.

In particular in the region of the venturi tube 108, a cross section of a compressed gas line 110 connected upstream to the venturi tube 108 decreases so that a negative pressure develops in the region of the connection between the intermediate storage device 80 and the venturi tube 108. The transfer device 82 which sucks the $CO_2$ pellets 16 into the compressed gas line is defined in this way. The venturi tube 108 also forms a part of the accelerating device 58 which accelerates the substantially stationary $CO_2$ pellets 16 from the intermediate storage device 80 to substantially the speed of the compressed gas 14 flowing in the compressed gas line 110. Downstream of the venturi tube 108, the mixed-flow 12 consisting of $CO_2$ pellets 16 and compressed gas 14 then flows through the line 60 to the jet outlet connector 62.

A pressure separating device 106 is preferably formed between the pick-up container 38 and the intermediate storage device 80. The separating device serves to form a pressure stage between the pre-compressing device 31 and a pellet outlet 138. The pressure separating device 106 comprises at least one gas-tight or substantially gas-tight sealing element 140 which is arranged between the expansion device 34 and the pellet outlet 138. The at least one sealing element 140 is preferably formed from $CO_2$ snow 36 and in particular from pre-compressed $CO_2$ snow 36. As is schematically illustrated in FIGS. 2 to 4, the at least one sealing element 140 is arranged or formed between the at least one compressor wheel 86 and the at least one pick-up wheel 92.

The pre-compressing device 31 is described in greater detail and the functioning thereof is explained in the following.

The pre-compressing device 31 comprises the expansion device 34 for producing $CO_2$ snow 36 from liquid or gaseous $CO_2$ as well as the pre-compression chamber 38. The pre-compressing device 31 is constructed in the form of a fluid-mechanical pre-compressing device 31.

The pre-compression chamber 38 and the expansion device 34 are connected to one another in fluidic manner.

The pre-compression chamber 38 is in the form of a pipe 156. In FIGS. 2 to 5, there is exemplarily illustrated a curved pipe 38 which comprises an inlet 158 that defines an inlet longitudinal axis 160 and an outlet 162 which defines an outlet longitudinal axis 164. The inlet longitudinal axis 160 and the outlet longitudinal axis 164 include between them a chamber angle 166 which may lie in a range of 0° to 180°. The chamber angle 166 preferably lies in a range of approximately 45° to 135°. It amounts to approximately 90° in the embodiments illustrated in the Figures.

The pre-compressing device 31 is formed for producing a gaseous $CO_2$ flow 168 which is directed at least partially onto an inner wall surface 170 of the pre-compression chamber 38. This can flow through the pre-compression chamber 38 in particular in the form of a helix or substantially in the form of a helix, whereby in particular a fluid-mechanical property of the pre-compresing device 31 is achieved.

An expanding nozzle 172 of the expansion device 34 serves for expanding the liquid or gaseous $CO_2$. The expanding nozzle 172 and its nozzle body 174 are seated in a boring 176 of a closure element 178. The boring 176 is aligned coaxially with the inlet longitudinal axis 160. The closure element 178 closes a first end 180 of the pipe 156. A blind hole 182 which opens in a direction pointing away from an interior space 184 of the pre-compression chamber 38 and is aligned coaxially with the boring 176 defines the inlet 158 which, for example, is connected in fluidic manner to the feeder line 30.

The expanding nozzle 172 comprises two nozzle outlet openings 186 which respectively define a nozzle outlet longitudinal axis 188. Alternatively, just one nozzle outlet opening 186 or three or more nozzle outlet openings 186 can be provided. The nozzle outlet longitudinal axes 188 and the inlet longitudinal axis 160 define between them an inlet angle 190. The inlet angle 190 preferably lies in a range of approximately 0° to approximately 90°. It is particularly advantageous if the inlet angle 190 lies in a range of approximately 35° to approximately 70°. An inlet angle 190 of 0° thus means that the nozzle outlet opening 186 is aligned in parallel with and in particular coaxially with the inlet longitudinal axis 160, an inlet angle 190 of 90° means that the nozzle outlet longitudinal axis 188 runs perpendicularly to the inlet longitudinal axis 160. The inlet angle 190 is illustrated in FIG. 5 with a value of approximately 65°.

The expanding nozzle 172 is arranged and formed in such a manner that the nozzle outlet openings 186 open out into the interior space 184.

The closure element 178 is inserted into the pipe 156 in sealing manner, the expanding nozzle 172 into the boring 176 of the closure element 178 in sealing manner.

A center line 192 of the curved pipe 156 is drawn schematically in FIG. 4. In the case of an alternative pipe 156 running in a straight line, the center line 192 then defines the longitudinal axis of the pipe which would coincide with the inlet longitudinal axis 160 as well as the outlet longitudinal axis 164.

The FIGS. 2 to 5 show an expanding nozzle 172 in the form of a swirl nozzle 194. In this case in particular, the nozzle outlet longitudinal axis 188 and the inlet longitudinal axis 160 can intersect or run skewed relative to each other.

Alternatively, in the case of the expanding nozzle 172 in conjunction with a curved pipe 156, the nozzle outlet opening 186 could also be aligned in parallel with or coaxial to the inlet longitudinal axis 160. This in particular, because in the case of a correspondingly heavily curved pipe 156, the $CO_2$ flowing into the interior space 184 will eventually strike the inner wall surface 170.

In the case of the swirl nozzle 194, this results in a substantially helical $CO_2$ stream 168 as schematically illustrated in FIG. 2. $CO_2$ snow 36 settles at different positions of the inner wall surface 170 for such a $CO_2$ stream 168 and is pre-compressed by a subsequent impact of $CO_2$ snow 36. However, due to the $CO_2$ stream 168, agglomerated and pre-compressed accumulations of $CO_2$ snow are also detached from the inner wall surface 170 again and so enter the main compressing device 44 through the outlet 162 in the form of pre-compressed $CO_2$ snow 36.

For the purposes of obtaining particularly good results for the process of pre-compressing the $CO_2$ snow 36 that is produced by the expansion device 34, it is expedient if the pre-compression chamber 38 has a diameter and a length 198 along the center line 192, namely with a ratio between the length 198 and the diameter 196 which lies in a range of approximately 5:1 up to approximately 20:1. Preferably, the ratio between the length 198 and the diameter 196 lies in a range of approximately 6:1 to approximately 13:1. In particular, the ratio can amount to approximately 7.5:1.

Furthermore, it is advantageous if the pre-compression chamber 38 has a radius of curvature 200 with respect to the center line 192 and if a ratio between the radius of curvature 200 and the diameter 196 lies in a range of approximately 2:1 to approximately 10:1. In particular, it is advantageous if the ratio between the radius of curvature 200 and the diameter 196 lies in a range of approximately 2:1 to approximately 7:1. Preferably, the ratio amounts to approximately 2.4:1.

An alternative arrangement of the expansion device 34 is partly illustrated exemplarily in FIGS. 6 to 8. A rotor nozzle 202 is inserted into the end 180 of the pre-compression chamber 38 instead of the swirl nozzle 104.

The employment of a rotor nozzle 202 as an expanding nozzle 172 has, in particular, the advantage that the pre-compression chamber 38 can also readily be in the form of a straight pipe 156.

A rotor nozzle in the form of rotor nozzle 202 as is illustrated exemplarily in FIGS. 6 to 8 is employed in particular as a so-called dirt blaster for removing stubborn impurities by a high pressure cleaning process. However, there, they are used in an inverted form of construction.

The rotor nozzle 202 comprises a nozzle chamber 204 which tapers towards the nozzle outlet opening 186. A nozzle body 206 which comprises a longitudinal channel 208 having a tapering cross section that opens out into the nozzle outlet opening 186 is mounted in rotatable manner in the interior of the nozzle chamber 204.

An end 210 of the nozzle body 206 located opposite the nozzle outlet opening 186 is freely moveable and can be deflected laterally with respect to the inlet longitudinal axis 160.

A plurality of $CO_2$ outlets 212 which are oriented transversely and in particular perpendicularly to the inlet longitudinal axis 160 open out into the nozzle chamber 204. Due to the $CO_2$ flowing into the nozzle chamber 204, the nozzle body 206 is deflected with respect to the inlet longitudinal axis 160 and rotates about it. However, the nozzle outlet opening 186 is also deflected relative to the inlet longitudinal axis 160 so that an inlet angle 190 between the nozzle outlet longitudinal axis 188 and the inlet longitudinal axis 160 is defined. Thus, overall, a cone angle 214 of the $CO_2$ stream 168 flowing into the interior 184 which corresponds to double the inlet angle 190 is defined.

In other respects, the device 42 can be constructed as described above. Thus in principle, the swirl nozzle 194 and the rotor nozzle 202 can be exchanged as desired.

The apertures 118 as well as all other edges of the device 42 which can come into contact with $CO_2$ snow 36 are preferably sunken or rounded off. The formation of snow bridges can be prevented in this way.

Overall, the device 42 is completely sealed in relation to its environment. The formation of water ice in the interior of the device 42 can thus be prevented.

Not illustrated in the Figures is an optional protection device which comprises an excess pressure valve in order to enable the pressure particularly between the interior 184 and the environment of the device 42 to be balanced if the pressure prevailing in the interior space 184 due to the expansion of liquid $CO_2$ exceeds a given limiting value.

The cleaning device 10 and in particular the device 42 can optionally be operated in clocked manner. To this end in particular, a valve which is in the form of a solenoid valve and can be arranged in the $CO_2$ line 22 but which is not illustrated in greater detail can be utilized in order to set a quantity for the $CO_2$ snow 36 that is produced. Thus, for the purposes of cooling it down when beginning operation of the device 42, only small quantities of $CO_2$ snow 36 are preferably produced. Later on, the setting of a quantity of snow specific to the intended use can then be undertaken, in particular, in dependence on whether a low or a high abrasiveness of the particle jet 70 is desired.

Optionally, there can be provided in the device 42 a manual or fully automatic back flushing system which comprises a compressed air port for connecting it to a source of compressed air. Compressed air can then be blown through the device 42. In particular, the back flushing system can be arranged in such a manner that adherence of $CO_2$ pellets 16 in the transfer device 48 as well as in the intermediate storage device 80 is prevented.

Furthermore, the roller 146 of the roller dispenser 144 can optionally be rotated in clocked manner, i.e. not at a uniform rotational speed. In this way, pulsating operation can be set in a particularly simple manner when subjecting a surface that is to be cleaned to the high-strength $CO_2$ pellets 16 because the $CO_2$ pellets 16 are then delivered intermittently by the transfer device 48.

It is possible in the manner described to effectively clean surfaces with the mixed-flow 12 consisting of compressed gas 14 and highly compressed $CO_2$ pellets 16 using the cleaning device 10. The $CO_2$ pellets 16 sublimate after use and do not have to be disposed of separately.

LIST OF REFERENCE SYMBOLS 10 cleaning device
12 mixed-flow
14 compressed gas
16 $CO_2$ pellet
18 housing
20 $CO_2$ connector
22 $CO_2$ line
24 $CO_2$ reservoir
26 outlet
28 valve assembly
30 feeder line
31 pre-compressing device
34 expansion device
36 $CO_2$ snow
38 pre-compression chamber
40 separating device
42 device
44 main compressing device
46 gear wheel compressor
48 transfer device
50 compressed gas line
52 compressed gas connector
54 source of compressed gas
56 source of compressed gas
58 accelerating device
60 line
62 jet outlet
64 jet line
66 jet nozzle
68 valve
70 particle jet
72 wheel
74 chassis
76 drive
78 holding device
80 intermediate storage device
82 transfer device
84 extruding device
86 compressor wheel
88 first axis of rotation
90 second axis of rotation
92 pick-up wheel
94 tooth
96 compressing element
98 snow pick-up
100 drive
102 arrow
104 arrow
106 pressure separating device
108 venturi tube
110 compressed gas line
112 compressor wheel sleeve
114 pick-up wheel sleeve
116 extrusion matrix
118 aperture
120 boring
122 stripping device
124 stripping element
126 stripping edge
128 compressor wheel sleeve interior space
130 compressor wheel sleeve inner surface
132 pick-up wheel sleeve interior space
134 pick-up wheel sleeve inner surface
138 pellet outlet
140 sealing element
142 segregating device
144 roller dispenser
146 roller
148 recess
150 longitudinal axis
152 grating shaft
154 aperture
156 pipe
158 inlet
160 inlet longitudinal axis
162 outlet
164 outlet longitudinal axis
166 chamber angle
168 $CO_2$ flow 170 inner wall surface
172 expanding nozzle
174 nozzle body
176 boring
178 closure element
180 end
182 blind hole
184 interior space
186 nozzle outlet opening
188 nozzle outlet longitudinal axis
190 inlet angle
192 center line
194 swirl nozzle
196 diameter
198 length
200 radius of curvature
202 rotor nozzle
204 nozzle chamber
206 nozzle body
208 longitudinal channel
210 end
212 $CO_2$ outlet
214 cone angle

The invention claimed is:

1. A device for producing high-strength $CO_2$ pellets from $CO_2$ snow, in particular, for a cleaning device for blasting surfaces to be treated with a mixed-flow consisting of a compressed gas and $CO_2$ pellets, comprising a main compressing device for compressing $CO_2$ snow for forming $CO_2$ pellets, further comprising a pre-compressing device for pre-compressing $CO_2$ snow produced by expanding liquid $CO_2$, wherein the pre-compressing device is in the form of a fluid-mechanical pre-compressing device, wherein the pre-compressing device comprises an expansion device for producing $CO_2$ snow from liquid or gaseous $CO_2$ and a pre-compression chamber for receiving and pre-compressing the produced $CO_2$ snow and wherein the expansion device and the pre-compression chamber are connected to one another in fluidic manner.

2. The device in accordance with claim 1, wherein the fluid-mechanical pre-compressing device is formed for producing:
   a) a gaseous $CO_2$ stream in the pre-compression chamber which is directed at least partially onto an inner wall surface of the pre-compression chamber;
   or
   b) a helical or substantially helical gaseous $CO_2$ stream in the pre-compression chamber which is directed at least partially onto an inner wall surface of the pre-compression chamber.

3. The device in accordance with claim 1, wherein the expansion device comprises an expanding nozzle for expanding liquid or gaseous $CO_2$.

4. The device in accordance with claim 3, wherein at least one of:
   a) the expanding nozzle is arranged and formed for delivering liquid $CO_2$ into the pre-compression chamber;
   and
   b) the pre-compression chamber comprises an inlet defining an inlet longitudinal axis, wherein the expanding nozzle comprises at least one nozzle outlet opening, wherein the at least one nozzle outlet opening defines a nozzle outlet longitudinal axis and wherein the inlet longitudinal axis and the nozzle outlet longitudinal axis define between them an inlet angle which lies in a range of approximately 0° to 90°;
   and
   c) the pre-compression chamber comprises an inlet defining an inlet longitudinal axis, wherein the expanding nozzle comprises at least one nozzle outlet opening, wherein the at least one nozzle outlet opening defines a nozzle outlet longitudinal axis, wherein the inlet longitudinal axis and the nozzle outlet longitudinal axis define between them an inlet angle which lies in a range of approximately 0° to 90°, wherein the nozzle outlet longitudinal axis and the inlet longitudinal axis intersect one another or are skewed relative to each other or run parallel to each other.

5. The device in accordance with claim 3, wherein the expanding nozzle is in the form of a swirl or a rotor nozzle.

6. The device in accordance with claim 1, wherein the pre-compression chamber at least one of:
   a) is in the form of a pipe;
   and
   b) defines a longitudinal axis;
   and
   c) is curved.

7. The device in accordance with claim 1, wherein the pre-compression chamber at least one of:
   a) comprises an outlet defining an outlet longitudinal axis;
   and
   b) comprises an outlet defining an outlet longitudinal axis, wherein the outlet longitudinal axis and the inlet longitudinal axis include between them a chamber angle which lies in a range of approximately 0° to approximately 180°;
   and
   c) has a diameter and a length and that a ratio between the length and diameter lies in a range of approximately 4:1 to approximately 20:1;
   and
   d) has a radius of curvature and wherein a ratio between the radius of curvature and the diameter lies in a range of approximately 2:1 to approximately 10:1.

8. The device in accordance with claim 1, wherein the pre-compressing device comprises a mechanical pre-compressing unit having at least one movable pre-compressing element for compressing the produced $CO_2$ snow in the pre-compression chamber.

9. The device in accordance with claim 8, wherein the at least one pre-compressing element is in the form of a pressure member, in particular, in the form of a stamp or a piston or in the form of a roller.

10. The device in accordance with claim 1, wherein the pre-compressing device comprises:
    a) a $CO_2$ connector for connecting to a source of $CO_2$ containing liquid $CO_2$;
    or
    b) a $CO_2$ connector for connecting to a source of $CO_2$ containing liquid $CO_2$, wherein the $CO_2$ connector is connected in fluidic manner to the expansion device.

11. The device in accordance with claim 1, further comprising a source of $CO_2$ containing liquid $CO_2$ which is connected in fluidic manner to the pre-compressing device.

12. The device in accordance with claim 11, wherein the source of $CO_2$ is at least one of:
    a) a pressurised container containing liquid $CO_2$;
    and
    b) connected in fluidic manner to the pre-compressing device by a feeder line.

13. The device in accordance with claim 1, wherein:
a) the main compressing device is in the form of an extruding device;
or
b) the main compressing device is in the form of an extruding device, wherein the extruding device comprises at least one extrusion matrix incorporating a plurality of apertures.

14. The device in accordance with claim 13, wherein the extruding device is in the form of a gear wheel compressor.

15. The device in accordance with claim 14, wherein the gear wheel compressor comprises at least one compressor wheel having a plurality of compressing elements that is mounted such as to be rotatable about a first axis of rotation, and at least one pick-up wheel which is mounted such as to be rotatable about a second axis of rotation and cooperates with the at least one compressor wheel and which incorporates a plurality of snow pick-ups for receiving $CO_2$ snow that are formed in correspondence with the compressing elements.

16. The device in accordance with claim 15, wherein at least one of:
a) the plurality of compressing elements are in the form of teeth projecting from the compressor wheel in the radial direction and/or wherein the plurality of snow pick-ups are in the form of recesses which open in the radial direction;
and
b) the at least one compressor wheel and the at least one pick-up wheel are formed such as to be identical or substantially identical;
and
c) the plurality of snow pick-ups are in the form of gaps which are arranged or formed between the plurality of compressing elements.

17. The device in accordance with claim 13, wherein each of the plurality of apertures defines a longitudinal axis which extends away from the first or second axis of rotation in the radial direction or substantially in the radial direction.

18. The device in accordance with claim 15, wherein at least one of:
a) each snow pick-up is connected in fluidic manner to at least one aperture;
and
b) the compressor wheel comprises a compressor wheel sleeve having a compressor wheel sleeve wall and wherein the compressing elements are arranged or formed on an outer surface of the compressor wheel sleeve;
and
c) the pick-up wheel comprises a pick-up wheel sleeve having a pick-up wheel sleeve wall and wherein the snow pick-ups are arranged or formed in the pick-up wheel sleeve wall;
and
d) the device comprises a drive device for propelling at least one of the at least one compressor wheel and the at least one pick-up wheel.

19. The device in accordance with claim 15, further comprising a stripping device for stripping the formed $CO_2$ pellets from at least one of the at least one compressor wheel and from the at least one pick-up wheel.

20. The device in accordance with claim 19, wherein the stripping device comprises at least one stripping element which is arranged or formed in a compressor wheel sleeve interior space that is defined by the compressor wheel sleeve or in a pick-up wheel sleeve interior space that is defined by the pick-up wheel sleeve or which projects at least partly into said interior spaces.

21. The device in accordance with claim 20, wherein the at least one stripping element comprises a stripping edge which touches or almost touches a compressor wheel sleeve inner surface of the compressor wheel sleeve that delimits the compressor wheel sleeve interior space or which touches or almost touches a pick-up wheel sleeve inner surface of the pick-up wheel sleeve that delimits the pick-up wheel sleeve interior space.

22. The device in accordance with claim 1, wherein:
a) the main compressing device comprises a pellet outlet for delivering $CO_2$ pellets;
or
b) the main compressing device comprises a pellet outlet for delivering $CO_2$ pellets, wherein the pellet outlet is arranged or formed below the main compressing device in the direction of the force of gravity.

23. The device in accordance with claim 22, wherein the pellet outlet is connected in fluidic manner to an intermediate storage device for intermediate storage of the $CO_2$ pellets that have been produced.

24. The device in accordance with claim 23, wherein the pellet outlet or the intermediate storage device is connected in fluidic manner to a transfer device for conveying the $CO_2$ pellets that have been produced into a $CO_2$ pellet accelerating device for accelerating them.

25. The device in accordance with claim 1, further comprising a pressure separating device for forming a pressure stage between the expansion device and the pellet outlet.

26. The device in accordance with claim 25, wherein the pressure separating device comprises at least one gas-tight or substantially gas-tight sealing element and wherein the at least one sealing element is arranged between the expansion device and the pellet outlet.

27. The device in accordance with claim 26, wherein the at least one sealing element is at least one of:
a) formed from $CO_2$ snow, in particular, compressed $CO_2$ snow;
and
b) arranged or formed between the at least one compressor wheel and the at least one pick-up wheel.

28. A cleaning device for blasting surfaces to be treated with a mixed-flow consisting of a compressed gas and $CO_2$ pellets, further comprising a device for producing high-strength $CO_2$ pellets from $CO_2$ snow, said device for producing high-strength $CO_2$ pellets comprising a main compressing device for compressing $CO_2$ snow for forming $CO_2$ pellets, further comprising a pre-compressing device for pre-compressing $CO_2$ snow produced by expanding liquid $CO_2$, wherein the pre-compressing device is in the form of a fluid-mechanical pre-compressing device, wherein the pre-compressing device comprises an expansion device for producing $CO_2$ snow from liquid or gaseous $CO_2$ and a pre-compression chamber for receiving and pre-compressing the produced $CO_2$ snow and wherein the expansion device and the pre-compression chamber are connected to one another in fluidic manner.

29. The cleaning device in accordance with claim 28, further comprising at least one of:
   a) a $CO_2$ connector for connecting to a source of $CO_2$ containing liquid $CO_2$ or for connection by a source of $CO_2$ which contains liquid $CO_2$;
   and
   b) a compressed gas connector for connecting to a compressed gas producing device or for connection by a compressed gas producing device;
   and
   c) a transfer device for transferring the $CO_2$ pellets into a $CO_2$ pellet accelerating device for accelerating them;
   and
   e) a $CO_2$ pellet accelerating device which comprises in particular a compressed gas line which is connected in fluidic manner to the compressed gas connector or the compressed gas producing device.

30. The cleaning device in accordance with claim 28, wherein the cleaning device comprises at least one of:
   a) a transfer device for transferring the $CO_2$ pellets into a $CO_2$ pellet accelerating device for accelerating them, wherein the transfer device comprises at least one venturi tube;
   and
   b) a $CO_2$ pellet accelerating device which comprises in particular a compressed gas line which is connected in fluidic manner to the compressed gas connector or the compressed gas producing device, wherein the $CO_2$ pellet accelerating device comprises at least one venturi tube.

31. The cleaning device in accordance with claim 28, wherein the cleaning device comprises a transfer device for transferring the $CO_2$ pellets into a $CO_2$ pellet accelerating device for accelerating them, wherein the transfer device comprises downstream a jet outlet for connecting to a jet line or wherein the transfer device is connected in fluidic manner downstream to a jet line.

32. The cleaning device in accordance with claim 31, wherein a jet nozzle is arranged or formed at a free end of the jet line.

33. The cleaning device in accordance with claim 28, further comprising a $CO_2$ pellet intermediate storage device for intermediate storage of $CO_2$ pellets that have been produced.

34. The cleaning device in accordance with claim 33, wherein the $CO_2$ pellet intermediate storage device is connected directly or indirectly in fluidic manner to the main compressing device on the one hand and to the transfer device on the other.

* * * * *